(12) United States Patent
Bowman et al.

(10) Patent No.: US 7,384,620 B2
(45) Date of Patent: Jun. 10, 2008

(54) METHOD AND SYSTEM FOR PRODUCING HYDROGEN BY REFORMING HYDROGEN-CONTAINING GAS

(75) Inventors: Michael John Bowman, Niskayuna, NY (US); Chellappa Balan, Niskayuna, NY (US); Andrei Colibaba-Evulet, Clifton Park, NY (US); Narayan Ramesh, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 680 days.

(21) Appl. No.: 10/617,548

(22) Filed: Jul. 10, 2003

(65) Prior Publication Data

US 2005/0008566 A1    Jan. 13, 2005

(51) Int. Cl.
*B01J 19/00* (2006.01)
*B01J 19/18* (2006.01)
*C01B 3/02* (2006.01)

(52) U.S. Cl. .................. 423/648.1; 423/650; 422/129; 422/187; 422/242; 252/373; 95/55

(58) Field of Classification Search ............ 423/648.1, 423/650; 422/129, 187, 242; 252/373; 95/55
See application file for complete search history.

(56) References Cited

U.S. PATENT DOCUMENTS

| | | | |
|---|---|---|---|
| 3,656,905 A | 4/1972 | Smith et al. ............... 23/212 R |
| 4,004,554 A | 1/1977 | Kosaka et al. | |
| 4,108,114 A | 8/1978 | Kosaka et al. | |
| 4,186,181 A | 1/1980 | Giammarco et al. ........ 423/650 |
| 4,909,192 A | 3/1990 | Förster et al. | |
| 5,154,736 A | 10/1992 | Mifflin ........................... 55/26 |
| 5,900,031 A | 5/1999 | Bloomfield ............... 48/197 R |
| 6,066,307 A * | 5/2000 | Keskar et al. ............ 423/648.1 |
| 6,068,673 A | 5/2000 | Bloomfield ............... 48/197 R |
| 6,103,143 A | 8/2000 | Sircar et al. ................. 252/373 |
| 6,348,278 B1 | 2/2002 | LaPierre et al. | |
| 6,589,303 B1 * | 7/2003 | Lokhandwala et al. ...................... 48/197 FM |
| 6,767,530 B2 * | 7/2004 | Kobayashi et al. ......... 423/650 |
| 6,793,910 B1 * | 9/2004 | Lyons et al. ................ 423/650 |

FOREIGN PATENT DOCUMENTS

GB    2 148 385    5/1985

OTHER PUBLICATIONS

PCT Search Report—Dec. 1, 2004.
Zinn, Anthony N. et al., "Investigation of a Novel Reciprocating Compression Reformer for Use in Solid Oxide Fuel Cell Systems", Fuel Cell Science, Engineering and Technology, pp. 403-409, 2000.

* cited by examiner

*Primary Examiner*—Timothy C. Vanoy
(74) *Attorney, Agent, or Firm*—Patrick K. Patnode; Curtis B. Brueske

(57) ABSTRACT

A hydrogen reforming system includes a cyclical compression chamber having an entry port for receiving hydrogen-containing gas and an exit port for delivering reformed hydrogen-containing gas, an arrangement for heating the hydrogen-containing gas to a non-combustible temperature, and a drive system for cycling the cyclical compression chamber. The cyclical compression chamber has an operational cycle with an internal pressure and temperature absent combustion effective for reforming the hydrogen-containing gas.

20 Claims, 3 Drawing Sheets

METHOD AND SYSTEM FOR PRODUCING HYDROGEN BY REFORMING HYDROGEN-CONTAINING GAS

BACKGROUND OF THE INVENTION

The present disclosure relates generally to a method and system for producing hydrogen by reforming hydrogen-containing gas, and particularly to a method and system employing a cyclical compression chamber for reforming methane gas into hydrogen gas.

Fuels such as methane may be reformed by a variety of methods, such as POX (partial oxidation), CPOX (catalytic partial oxidation), ATR (autothermal reforming), and SMR (steam-methane reforming) for example, to produce hydrogen. Steam-methane reforming of hydrocarbons such as methane (natural gas, CH4) is an endothermic reaction that takes place at high temperatures between 500 and 1100 degree-Celsius (deg-C.). These methods tend to control equilibrium conversion and reaction rates by varying temperature, utilizing catalysts, and injecting steam or water, with the resulting systems tending to be complex and with complicated operation and control systems.

Accordingly, there is a need in the art to provide a method and system for effectively reforming hydrogen-containing gas into hydrogen gas that overcomes the complexities of present methods and systems.

SUMMARY OF THE INVENTION

In one embodiment, a hydrogen reforming system includes a cyclical compression chamber having an entry port for receiving hydrogen-containing gas and an exit port for delivering reformed hydrogen-containing gas, an arrangement for heating the hydrogen-containing gas to a non-combustible temperature, and a drive system for cycling the cyclical compression chamber. The cyclical compression chamber has an operational cycle with an internal pressure and temperature absent combustion effective for reforming the hydrogen-containing gas.

In another embodiment, a method for producing hydrogen by reforming hydrogen-containing gas is provided. The hydrogen-containing gas is introduced into a cyclical compression chamber, where the pressure and temperature are increased by reducing the volume of the cyclical compression chamber to initiate reformation chemistry. Reformation chemistry is continued in the cyclical compression chamber under conditions of appropriate pressure and temperature, and in the absence of combustion, effective to convert a portion of the hydrogen-containing gas into reformed hydrogen-containing gas. Following the reformation chemistry the reformed hydrogen-containing gas is discharged.

In a further embodiment, a hydrogen reforming system includes a cyclical compression chamber and an internal combustion engine coupled to the cyclical compression chamber for driving the cyclical compression chamber through a gas reforming cycle. The cyclical compression chamber has an entry port for receiving hydrogen-containing gas, an exit port for delivering reformed hydrogen-containing gas, and an operational cycle with an internal pressure and temperature absent combustion effective for reforming the hydrogen-containing gas. Heat generated by the internal combustion engine is transferred to the cyclical compression chamber for raising the temperature of the hydrogen-containing gas to a non-combustible temperature.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a system for producing hydrogen by reforming hydrogen-containing gas, such as a methane mixture for example, in a non-combusting process by utilizing a reciprocating piston and cylinder driven by a combustion engine to generate pressures and temperatures effective for initiating and carrying out reformation chemistry. While the embodiment described herein depicts a combustion engine as an exemplary power-plant for driving the reciprocating piston and cylinder, it will be appreciated that the disclosed invention may also utilize other power-plants for the drive system, such as an electric-powered motor, a wind-powered motor, a solar-powered motor, or a hydro-powered motor, for example. Also, while the embodiment described herein depicts a reciprocating piston and cylinder as a system for providing a cyclical compression chamber, it will be appreciated that other cyclical compression chambers may be employed, such as a rotary compression chamber for example.

Figure 1:
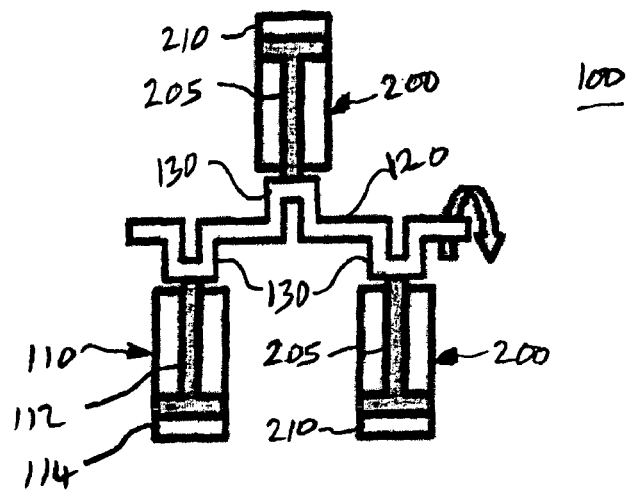
FIG. 1 depicts a cross sectional view of an exemplary hydrogen reforming system in accordance with an embodiment of the invention.

Referring now to FIG. 1, an exemplary embodiment of a three-cylinder hydrogen reforming system (HRS) 100 is depicted. HRS 100 includes an internal combustion cylinder (ICC) 110, and two hydrogen-reforming cylinders (hereinafter referred to as cyclical compression chambers, (CCC)) 200. In an embodiment, ICC 110 includes a piston 112 and a cylinder 114, which receives a fuel mixture and a timed ignition to provide a mechanical driving force, such as in a four-stroke gasoline-powered internal combustion engine for example. A driveshaft 120 with cranks 130 provides a mechanical connection between ICC 110 and each CCC 200 for driving each piston 205 within each cylinder 210 in a cyclical manner. While a three-cylinder HRS 100 is depicted, it will be appreciated that any arrangement of drive system cylinders and hydrogen reforming cylinders may be employed as necessary, thereby providing a scalable HRS 100.

Figure 2:
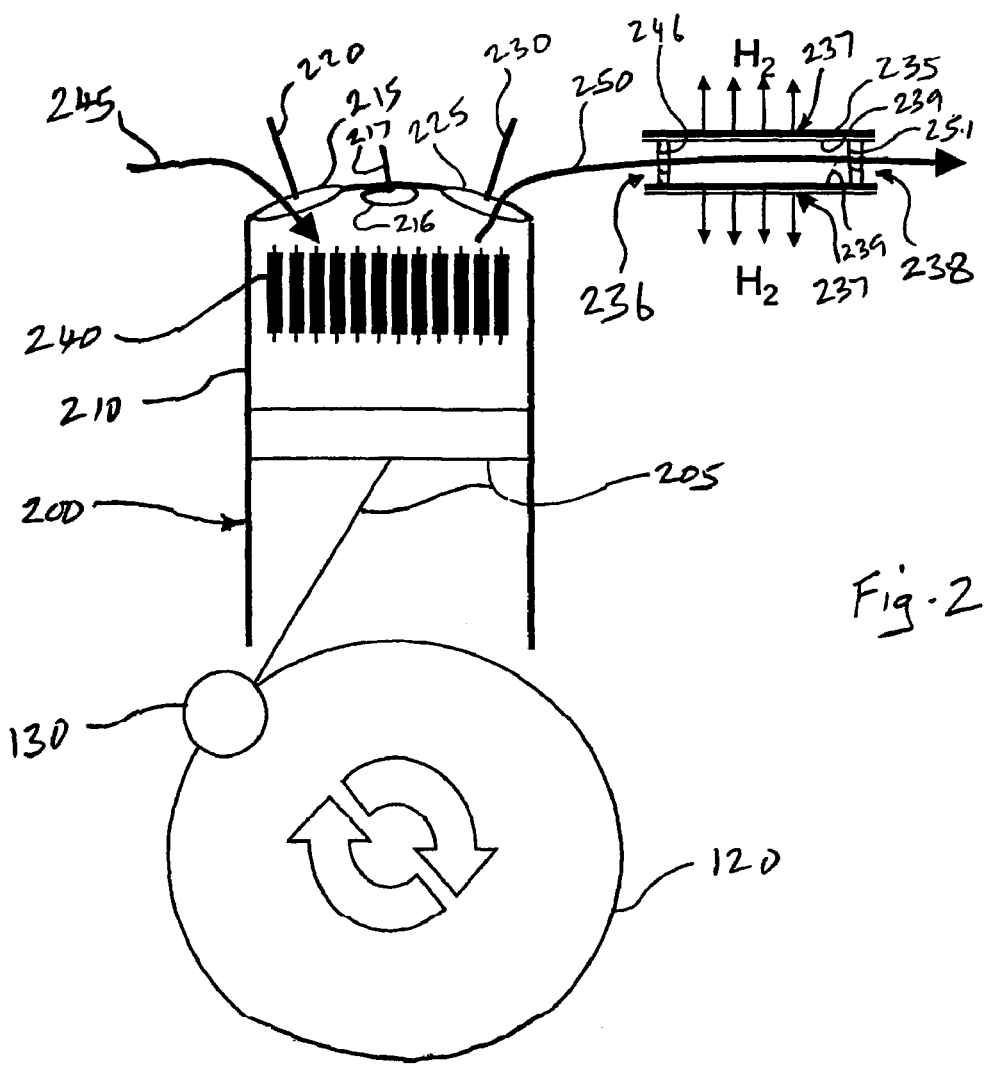
FIG. 2 depicts a more detailed cross sectional view of at least a portion of the system of FIG. 1.

Referring now to FIG. 2, an exemplary single CCC 200 is depicted having an entry port 215 with an entry valve 220 for receiving a hydrogen-containing gas, such as a methane mixture for example, and an exit port 225 with an exit valve 230 for delivering reformed hydrogen-containing gas to a gas separator 235. Gas separator 235 includes an entry port 236 for receiving the reformed hydrogen-containing gas, a first exit port 237 for delivering reformed hydrogen gas separated from the reformed hydrogen-containing gas, and a second exit port 238 for delivering gas separator byproducts. In an alternative embodiment, an entry valve 246 is arranged at entry port 236, an exit valve 251 is arranged at second exit port 238, and gas separator 235 includes a pressure swing adsorption (PSA) device (generally depicted by numeral 235). Entry and exit valves 246, 251 are arranged for regulating, pressurizing, and depressurizing the gas inside gas separator 235 in response to the pressure generated at CCC 200 to produce pressurized reformed hydrogen-containing gas, thereby enabling a pressure-driven gas separation process, as will be discussed further below. CCC 200 has an operational cycle that generates internal pressures and temperatures absent combustion that is effective for reforming the received hydrogen-containing gas, as will be discussed in more detail below. CCC 200 may also include an arrangement for heating the hydrogen-containing gas to a non-combustible temperature, such as internally via a catalyst 240 within cylinder 210, or externally via steam that may be added to the entry flow 245, which also includes the hydrogen-containing gas. In an alternative embodiment, different entry ports may be used for the steam (entry port 216) and hydrogen-containing gas (entry port 215). In a further alternative embodiment, the hydrogen-containing gas may be pre-heated, using steam for example, prior to entering CCC 200 through entry port 215. The exit flow 250, which includes the reformed hydrogen-containing gas, passes through gas separator 235, which in an embodiment may include a membrane penetrable by hydrogen gas molecules (H2), but not by methane (CH4), carbon-monoxide (CO), carbon-dioxide (CO2), or water (H2O) molecules, or may include a PSA device, as discussed above, for separating the hydrogen gas molecules from the other aforementioned molecules, thereby enabling substantially pure hydrogen gas to be extracted and used, or stored for future use. As used herein, substantially pure hydrogen gas refers to a hydrogen gas that may contain small traces of other elements, such as carbon for example.

Figure 3:
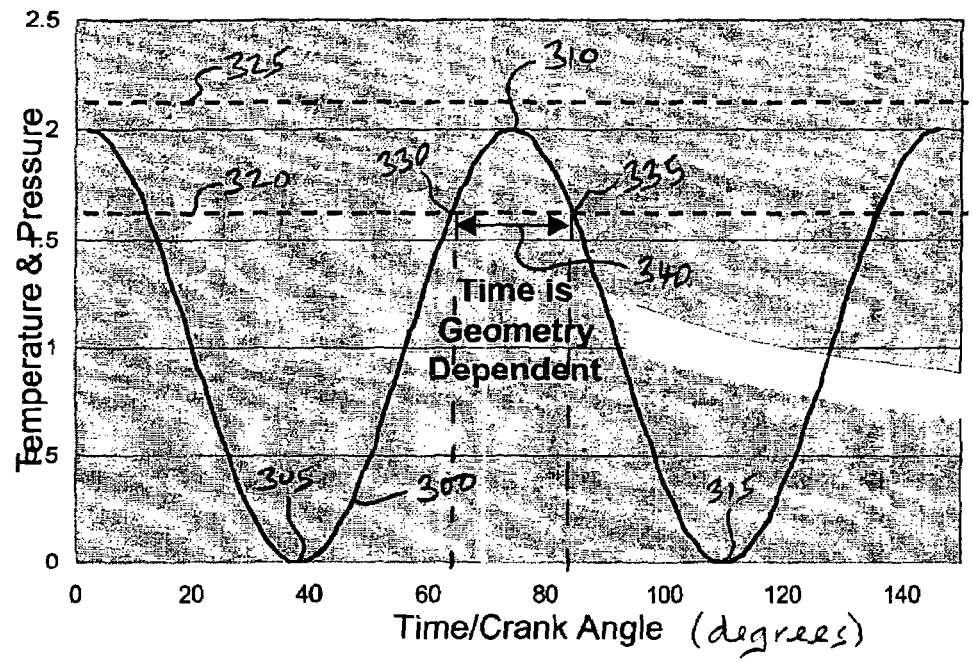
FIG. 3 is illustrative of an exemplary temperature and pressure characteristic of the system of FIG. 1 as a function of crank angle.

In an embodiment where a second entry port 216 is used for the introduction of steam, the open state of steam entry port 216 may be delayed until after maximum compression (top dead center), and until such a time when the internal volume of CCC 200 is increasing and the internal gas temperature is decreasing, thereby providing an injection of high temperature steam at an optimal point in the cycle for increasing the temperature of the hydrogen-containing gas to a non-combustible temperature as the volume of the CCC 200 increases. The timing of steam injection may be better seen by now referring to FIG. 3, which depicts a temperature/pressure curve (T/P curve) 300 of the hydrogen-containing gas within CCC 200 as a function of time or crank angle, in units of degrees. Hereinafter, reference will be made to crank angle as the cyclical timing of CCC 200 is known to be geometry dependent. In an exemplary embodiment, T/P curve 300 is at 305 in response to CCC 200 being at bottom-dead center (maximum volume and minimum compression), and at 310 in response to CCC 200 being at top-dead center (minimum volume and maximum compression). A full operational cycle occurs when CCC 200 returns to bottom-dead center, depicted generally at 315 on T/P curve 300. The horizontal dashed lines 320, 325 depicted in FIG. 3 represent the operational window in which ideal temperature and pressure conditions exist within CCC 200 for gas reformation. At 330 on T/P curve 300, before top-dead center, CCC 200 has compressed the hydrogen-containing gas sufficient to naturally, or with the aid of auxiliary heat, initiate reformation chemistry, and at 335 on T/P curve 300, after top-dead center, CCC 200 has expanded the reformed hydrogen-containing gas sufficient to naturally quench the reformation chemistry. However, by injecting steam after the point 310 and before the point 335 on T/P curve 300, an elevated temperature of the hydrogen-containing gas can be maintained as the volume of CCC 200 increases thereby prolonging the reformation chemistry for enhanced hydrogen production. In an embodiment, and as depicted in FIG. 3, the crank angle differential 340 from point 330 to point 335 on T/P curve 300 is about 20 degrees. However, in other embodiments the crank angle differential 340 between points 330 and 335 may vary from about 15 degrees to about 25 degrees.

Figure 4:
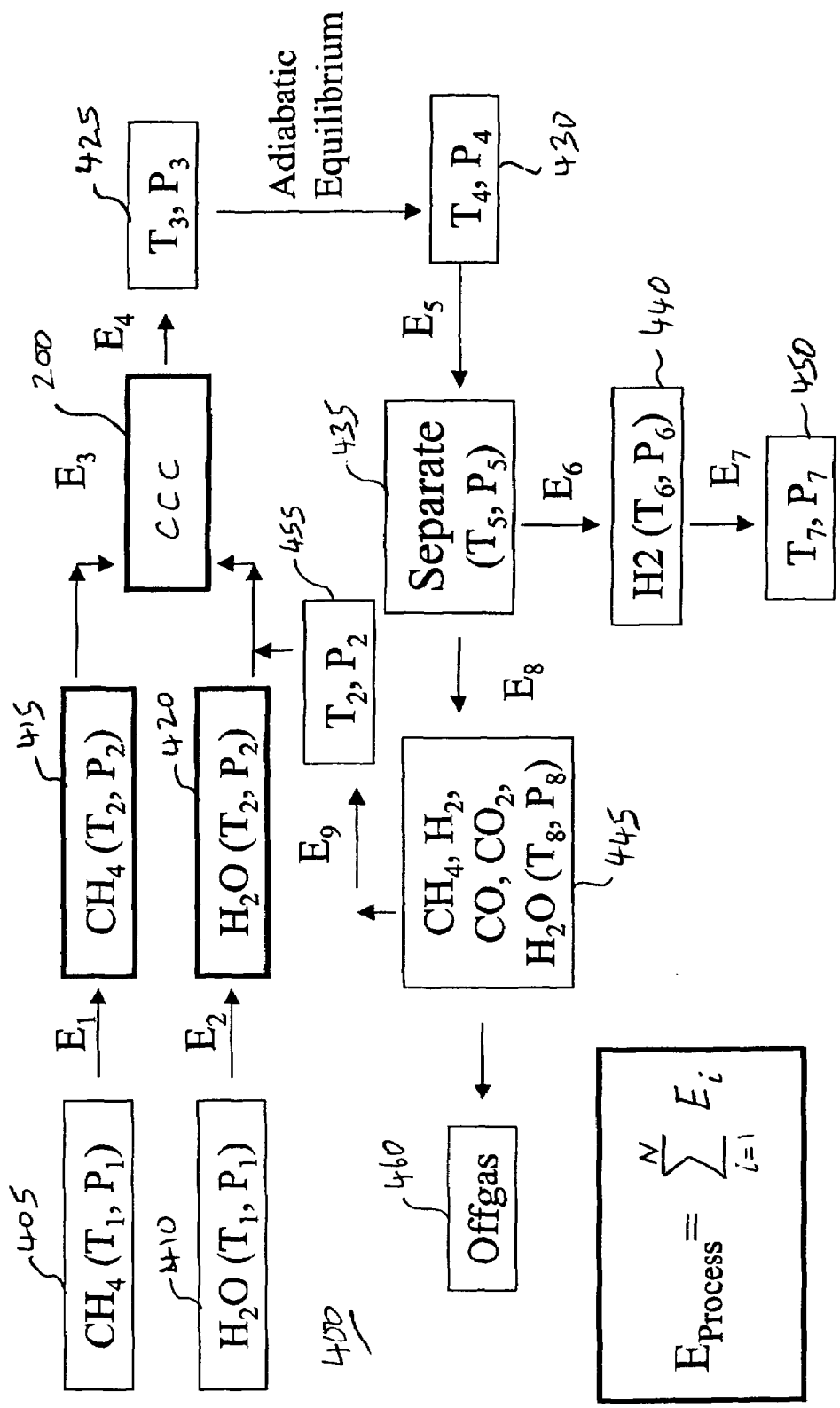
FIG. 4 depicts an exemplary block diagram of the energy flow in the system of FIG. 2.

Referring now to FIG. 4, an exemplary energy balance analysis 400 relating to HRS 100 will now be discussed in relation to FIGS. 1-3. At blocks 405, 410, methane gas (CH4) and water (H2O) are introduced to HRS 100 at temperature T1 and pressure P1. As used herein, the numerals associated with temperature symbol T (such as T1 or T2 for example) and with pressure symbol P (such as P1 or P2 for example) are intended to represent temperature and pressure changes from one stage to the next, and do not necessarily denote the same temperature and pressure at a given stage. In an embodiment, the methane gas 405 is introduced to CCC 200 via entry port 215 ahead of the water 410, and is introduced at an elevated temperature and pressure T2/P2, block 415. As discussed above, the water 410 may be introduced to CCC 200 as steam via entry port 216 at a temperature and pressure T2/P2, block 420, which may be introduced after top-dead center of CCC 200, as the volume of CCC 200 is increasing, and as the T/P curve 300 is approaching point 335. Reformation chemistry takes place within CCC 200, and between dashed-line window 320, 325 and points 330, 335 on T/P curve 300, thereby reforming the methane and steam mixture into a gas mixture containing hydrogen. During reformation chemistry, the temperature and pressure within CCC 200 changes from T3/P3 at block 425 to T4/P4 at block 430, with the reformed hydrogen-containing gas exiting CCC 200 via exit flow 250 to gas separator 235 at a temperature and pressure of T5/P5, block 435. In an embodiment, gas separator 235 includes a membrane penetrable by hydrogen gas molecules (H2), but not penetrable by methane (CH4), carbon-monoxide (CO), carbon-dioxide (CO2), or water (H2O) molecules, thereby enabling the separation of hydrogen gas at temperature and pressure T6/P6, block 440, from separator byproducts (CH4, CO, CO2, and H2O) at temperature and pressure T8/P8, block 445. The hydrogen gas may then be used or stored at temperature and pressure T7/P7, block 450. The separator byproducts at T8/P8 445 may be used to provide the needed energy E9, via a heat transfer device (heat exchanger for example) depicted generally at block 455, to elevate the temperature of the water at T1/P1 410 to steam at T2/P2 420. In this manner, system-generated energy is recycled back into the system for heating the hydrogen-containing gas to a non-combustible temperature. The extraction of thermal energy E9 from the separator byproducts at 445 results in exhaust products (offgas), depicted generally at block 460.

Figure 5:
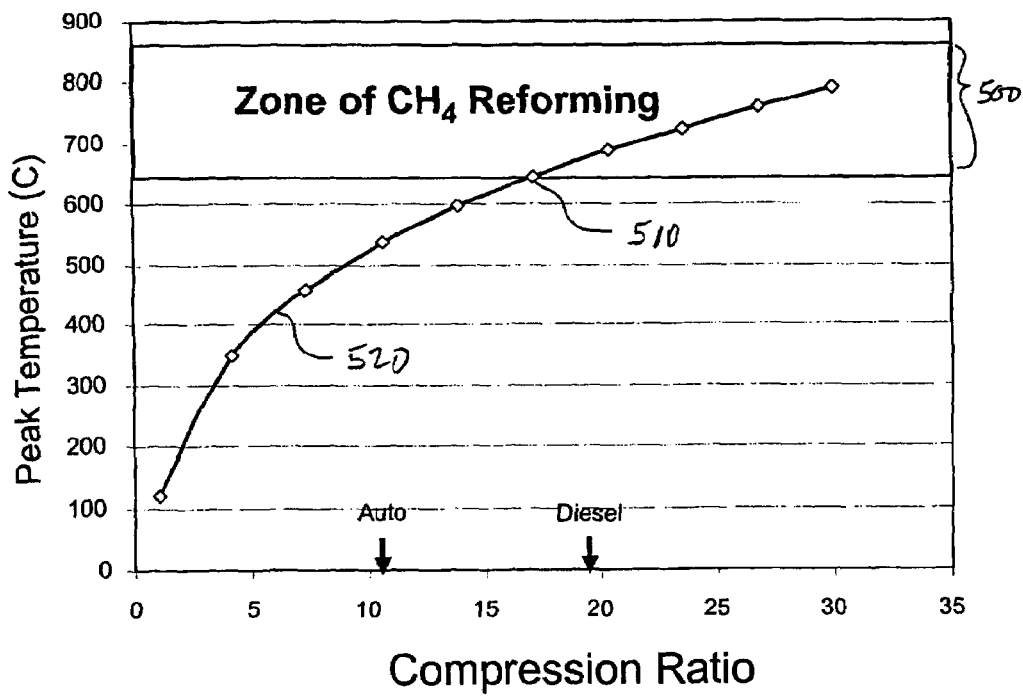
FIG. 5 is illustrative of the temperature and pressure characteristic for an exemplary gas-reforming zone in accordance with an embodiment of the invention.

In an embodiment, and referring now to FIG. 5, the effective temperature internal to CCC 200 for promoting reformation chemistry is depicted in zone 500 ("Zone of CH4 Reforming") as being is equal to or greater that about 650 degrees Celsius and equal to or less than about 900 degrees Celsius, and the effective pressure internal of CCC 200 for promoting reforming chemistry is depicted by the interception point 510 of line 520 (temperature vs. compression ratio line) and zone 500 as having a compression ratio of equal to or greater than 17, with a high compression pressure being at about 35 to about 50 bar.

To produce hydrogen gas using CCC 200 in HRS 100, which is driven by ICC 110, shaft 120 and cranks 130, the hydrogen-containing gas (methane gas for example) is introduced into CCC 200 via entry port 215 when piston 205 and cylinder 210 provide an internal volume at or about a maximum value (bottom dead center), depicted generally at point 305 on T/P curve 300. Continued cranking of shaft 120 reduces the internal volume of CCC 200, which serves to increase the pressure and temperature of the methane gas. To initiate reformation chemistry, additional heat may be supplied to CCC 200, either via steam 420 or catalyst 240. Regarding steam 420, the steam may be introduced with the methane gas 405, 415 via entry port 215, or may be introduced via a separate entry port 216. If steam entry port 216 is employed, timing controls on the entry valve 217 may be used to introduce a first portion of steam at or about point 330 on T/P curve 300 to help initiate reformation chemistry, and a second portion of steam at or about point 335 on T/P curve 300 to help prolong reformation chemistry, as will be discussed further below. Continued cycling of CCC 200 causes the internal temperature/pressure characteristic to traverse T/P curve 300 from point 305 to point 330, where reformation chemistry is initiated. Reformation chemistry continues to point 335 with continued cycling of CCC 200. Between points 330 and 335, the temperature and pressure within an embodiment of CCC 200 is within the range of about 650 to about 900 degrees-Celsius, and within the range of about 35 to about 50 bars, respectively. The temperature and pressure conditions conducive to reformation chemistry is represented by dashed-line boundaries 320, 325 in FIG. 3, and within these boundaries, CCC 200 is absent combustion. As CCC 200 is cycling through point 335 on T/P curve 300, the volume of CCC 200 is increasing, which reduces the internal temperature and pressure and results in the reformation chemistry being quenched. However, as discussed above, a portion, or second portion, of steam may be introduced into CCC 200 prior to point 335 on T/P curve 300 via steam entry port 216, thereby elevating the temperature of the internal hydrogen-containing gas to further prolong reformation chemistry. After reformation chemistry has been quenched through continued cycling of CCC 200, exit port 225 opens via exit valve 230 to permit the discharge of the reformed hydrogen-containing gas. In an embodiment, the opening and closing of valves 217, 220, and 230 to control the introduction, sealing and exhaust of the methane gas, steam, and reformed gas is performed in a known manner using known valve control techniques.

The discharged reformed gas is passed through hydrogen gas separator 235 where it is separated into hydrogen gas (H2), block 440 in FIG. 4, and byproducts (CH4, CO, CO2, and H2O, for example), block 445 in FIG. 4. In an embodiment, gas separator 235 is a membrane structure, where the reformed gas enters at entry port 236, the hydrogen gas molecules pass through a hydrogen-gas-penetrable-membrane 239 to exit at first exit port 237, and the separator byproducts exit at second exit port 238.

Referring now to FIG. 4, an embodiment of HRS 100 includes heat exchanger 455 that extracts heat from byproducts 445 and transfers the heat to CCC 200 via steam 420. In an embodiment where it is desired to further the degree of reformation chemistry prior to quenching the reformation chemistry, steam 420 may be introduced as a second portion of steam prior to point 335 on T/P curve 300, as discussed above. The energy conversion occurring at heat exchanger 455 converts byproducts 445 into thermal energy, discussed above, and exhaust products (offgas) 460.

In an exemplary HRS 100, a set of CCCs 200 are combined with a set of ICCs 110, such as an internal combustion engine as discussed above for example, and a drive shaft 120 to provide a self-contained HRS 100 having both a drive system and a gas reformation system. In such an integral arrangement, the heat generated by the engine may be used, via a heat transfer device, to elevate the temperature of the hydrogen-containing gas in CCC 200 to a non-combustible temperature, thereby promoting the initiation of reformation chemistry or prolonging the duration of reformation chemistry, as discussed above. Also, such an integral arrangement may include a gas separator 235 arranged in fluid communication with CCC 200 for receiving the reformed hydrogen-containing gas 430 at an entry port 236, delivering reformed hydrogen gas 440 at a first exit port 237, and delivering gas separator byproducts 445 at a second exit port 238. The energy available from separator byproducts 445 may be combined with the thermal energy available from the combustion engine, transformed via heat exchanger 455, and delivered back to CCC 200 for assisting in reformation chemistry as discussed above.

In an exemplary embodiment, natural gas (high methane content gas) is made available at a temperature and pressure of about 298 deg-Kelvin (deg-K.) (about 25 deg-C.) and about 1-atmosphere (atm), and steam is made available at about 398 deg-K. and about 1-atm, where the two are mixed together in an appropriate proportion, about 1:3 for example, and pre-heated to a temperature of about 573 deg-K. The pre-heated mixture, or feed, is then introduced as entry flow 245 into CCC 200 via entry port 215. Piston 205 is cyclically operated in a manner described above to compress the feed by a compression ratio of 22:1, for example, which raises the feed temperature and pressure to about 1154 deg-K. and about 44-atm. Reformation chemistry in CCC 200 causes conversion of the hydrogen-containing gas to reformed hydrogen-containing gas at a temperature and pressure of about 912 deg-K. and about 38-atm, which enables a methane-to-hydrogen conversion of about 22% at gas separator 235.

As disclosed and described, some embodiments of the invention may include some of the following advantages: a non-combustion process for producing substantially pure hydrogen; an integral arrangement of a cyclical combustion engine and a cyclical hydrogen reformation system; effective use of a piston and cylinder arrangement for simplified hydrogen production; internal or external heating of the reforming fuel; alternative methods of powering the hydrogen reforming system; self-controlled chemistry initiation and quenching; and, low complexity.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A hydrogen reforming system, comprising:
   a cyclical compression chamber having an entry port for receiving hydrogen-containing gas and an exit port for delivering reformed hydrogen-containing gas, the cyclical compression chamber having an operational cycle with an internal pressure and temperature absent combustion effective for reforming the hydrogen-containing gas;

a heating system for heating the hydrogen-containing gas to a non-combustible temperature; and a drive system for cycling the cyclical compression chamber;

wherein the heating system comprises a source of steam and a second entry port at the cyclical compression chamber for receiving the steam, the second entry port having an open state in response to the volume of the cyclical compression chamber increasing, thereby providing an injection of steam for increasing the temperature of the hydrogen-containing gas to a non-combustible temperature as the volume of the cyclical compression chamber increases for prolonging reformation chemistry.

2. The system of claim 1, further wherein:

the second entry port having an open state in response to the volume of the cyclical compression chamber decreasing, thereby providing an injection of steam for increasing the temperature of the hydrogen-containing gas to a non-combustible temperature as the volume of the cyclical compression chamber decreases for promoting the initiation of reformation chemistry.

3. The system of claim 1, wherein the drive system comprises:

a power-plant selected from the group consisting of combustion engine, an electric-powered motor, a wind-powered motor, a solar-powered motor and a hydro-powered motor; and a drive shaft responsive to the power-plant and in operable communication with the cyclical compression chamber.

4. The system of claim 1, further comprising:

a gas separator having an entry port for receiving the reformed hydrogen-containing gas, a first exit port for delivering reformed hydrogen separated from the reformed hydrogen-containing gas, and a second exit port for delivering gas separator byproducts.

5. The system of claim 4, wherein the gas separator comprises a membrane penetrable by hydrogen gas and non-penetrable by methane, carbon-monoxide, carbon-dioxide, or water.

6. The system of claim 4, wherein the gas separator comprises:

an entry valve and an exit valve, each in fluid communication with the cyclical compression chamber, arranged for pressurizing and depressurizing the reformed hydrogen-containing gas in the gas separator in response to a change in pressure at the cyclical compression chamber to produce pressurized reformed hydrogen-containing gas;

wherein the pressurized reformed hydrogen-containing gas is separated in the gas separator into hydrogen gas and byproducts.

7. The system of claim 4, further comprising:

a heat transfer device for transferring heat from the gas separator byproducts to the means for heating the hydrogen-containing gas, thereby utilizing system-generated energy for heating the hydrogen-containing gas to a non-combustible temperature.

8. The system of claim 1, wherein:

the effective temperature internal of the cyclical compression chamber is equal to or greater than 650 degrees Celsius and equal to or less than 900 degrees Celsius; and the effective pressure internal of the cyclical compression chamber has a compression ratio of equal to or greater than 17.

9. A method for producing hydrogen by reforming hydrogen-containing gas, comprising:

introducing the hydrogen-containing gas into a cyclical compression chamber;

increasing the pressure and temperature of the hydrogen-containing gas by reducing the volume of the cyclical compression chamber to initiate reformation chemistry;

continuing the reformation chemistry in the cyclical compression chamber under conditions of pressure and temperature and in the absence of combustion effective to convert a portion of the hydrogen-containing gas into reformed hydrogen-containing gas;

quenching the reformation chemistry by increasing the volume of the cyclical compression chamber; and discharging the reformed hydrogen-containing gas from the cyclical compression chamber.

10. The method of claim 9, further comprising:

pre-heating the hydrogen-containing gas prior to introducing the hydrogen-containing gas into the cyclical compression chamber.

11. The method of claim 9, further comprising:

separating the reformed hydrogen-containing gas into hydrogen gas and byproducts.

12. The method of claim 11, wherein the separating the reformed hydrogen-containing gas comprises:

pressurizing and depressurizing the reformed hydrogen-containing gas in response to a change in pressure at the cyclical compression chamber to produce pressurized reformed hydrogen-containing gas; and separating the pressurized reformed hydrogen-containing gas in a pressure-driven manner into hydrogen gas and byproducts.

13. The method of claim 11, further comprising:

introducing auxiliary heat into the cyclical compression chamber to continue the reformation chemistry as the volume of the cyclical compression chamber increases, thereby furthering the degree of reformation prior to the quenching the reformation chemistry.

14. The method of claim 13, further comprising:

introducing auxiliary heat into the cyclical compression chamber as the volume of the cyclical compression chamber decreases to promote the initiation of reformation chemistry.

15. The method of claim 13, further comprising:

converting the byproducts of the separated reformed hydrogen-containing gas into thermal energy and exhaust products;

wherein the introducing auxiliary heat comprises introducing auxiliary heat acquired from the thermal energy.

16. The method of claim 13, wherein the introducing auxiliary heat comprises introducing steam into the cyclical compression chamber.

17. The method of claim 9, wherein the continuing the reformation chemistry in the cyclical compression chamber under conditions of pressure and temperature and in the absence of combustion effective to convert a portion of the hydrogen-containing gas into reformed hydrogen-containing gas comprises:

continuing the reformation chemistry at a temperature of equal to or greater than 650 degrees Celsius and equal to or less than 900 degrees Celsius; and continuing the reformation chemistry at a pressure having a compression ratio of equal to or greater than 17.

18. The method of claim 17, wherein the continuing the reformation chemistry further comprises:
continuing the reformation chemistry for a crank angle duration equal to or greater than 15 degrees.

19. A hydrogen reforming system, comprising:
a cyclical compression chamber having an entry port for receiving hydrogen-containing gas, an exit port for delivering reformed hydrogen-containing gas and a second entry port for receiving steam, the second entry port having an open state in response to the volume of the cyclical compression chamber increasing, thereby providing an injection of steam for increasing the temperature of the hydrogen-containing gas to a non-combustible temperature as the volume of the cyclical compression chamber increases for prolonging reformation chemistry, wherein the cyclical compression chamber have an operational cycle with an internal pressure and temperature absent combustion effective for reforming the hydrogen-containing gas; and
an internal combustion engine coupled to the cyclical compression chamber for driving the cyclical compression chamber through a gas reforming cycle;
wherein heat generated by the internal combustion engine is transferred to the cyclical compression chamber for raising the temperature of the hydrogen-containing gas to a non-combustible temperature.

20. The system of claim 19, further comprising:
a gas separator having an entry port for receiving the reformed hydrogen-containing gas, a first exit port for delivering reformed hydrogen separated from the reformed hydrogen-containing gas, and a second exit port for delivering gas separator byproducts.

* * * * *